(12) United States Patent (10) Patent No.: US 12,587,818 B2

Sandridge et al. (45) Date of Patent: Mar. 24, 2026

(54) DEVICE AND ROLE BASED USER AUTHENTICATION

(71) Applicant: INTERNATIONAL BUSINESS MACHINES CORPORATION, Armonk, NY (US)

(72) Inventors: Thomas Jefferson Sandridge, Tampa, FL (US); Michael Boone, Lutz, FL (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 17/806,958

(22) Filed: Jun. 15, 2022

(65) Prior Publication Data

US 2023/0413025 A1 Dec. 21, 2023

(51) Int. Cl.
H04W 4/90 (2018.01)
G08B 25/10 (2006.01)
(Continued)

(52) U.S. Cl.
CPC .............. H04W 4/90 (2018.02); G08B 25/10 (2013.01); H04W 4/80 (2018.02); G16Y 40/10 (2020.01)

(58) Field of Classification Search
CPC .......... H04W 4/90; H04W 4/80; G08B 25/10; G16Y 40/10
See application file for complete search history.

(56) References Cited

U.S. PATENT DOCUMENTS 7,870,595 B2 * 1/2011 Finney .................. H04L 63/105
726/4
8,474,018 B2 6/2013 Mardikar
(Continued)

FOREIGN PATENT DOCUMENTS

| | | |
|---|---|---|
| CA | 2901683 A | 2/2016 |
| CN | 105069876 A | 11/2015 |
| WO | 2021250539 A1 | 12/2021 |

OTHER PUBLICATIONS

Atlantic Scale Company, Inc., "The Equipment Validation Process", http://atlanticscale.com/equipment-validation-process/, Mar. 1, 2022, pp. 1-3.

(Continued)

*Primary Examiner* — Santiago Garcia

(74) *Attorney, Agent, or Firm* — Tihon Poltavets

(57) ABSTRACT

A method for device and role-based authentication includes generating a near-body electrical-field via a communication transmitter associated with a user, where a plurality of IoT devices is further associated with the user attempting authentication for access to a location. The method further includes receiving the near-body electrical-field via a communication receiver on an authentication device for identifying the user attempting the authentication. In response to identifying the user based on the near-body electrical-field, the method further includes analyzing a plurality of activities associated with a role for the user and analyzing plurality of resources associated with the user, wherein the plurality resources include at least the plurality of IoT devices associated with the user. In response to determining the user is authenticated based on the analyzing of the plurality of activities and the analyzing of the resources associated with the user, the method further includes granting access to the location.

18 Claims, 6 Drawing Sheets

(51) Int. Cl.
    *G16Y 40/10*            (2020.01)
    *H04W 4/80*            (2018.01)

(56)         References Cited

U.S. PATENT DOCUMENTS

| | | | | |
|---|---|---|---|---|
| 8,629,755 | B2 | 1/2014 | Hashim-Waris | |
| 8,771,018 | B2 * | 7/2014 | McGrath | H01R 12/55 |
| | | | | 439/630 |
| 9,380,058 | B1 * | 6/2016 | Ligatti | H04L 63/08 |
| 10,148,629 | B1 * | 12/2018 | Roth | H04L 63/0838 |
| 10,600,138 | B2 * | 3/2020 | Stortstrom | G06V 20/653 |
| 11,182,995 | B1 * | 11/2021 | Goetz | G07C 9/00912 |
| 12,167,243 | B2 * | 12/2024 | Gibbs | H04L 63/0853 |
| 2009/0267776 | A1 * | 10/2009 | Glenn | G16H 40/20 |
| | | | | 340/573.1 |
| 2014/0006040 | A1 * | 1/2014 | Apell | G06Q 10/10 |
| | | | | 705/2 |
| 2014/0307076 | A1 * | 10/2014 | Deutsch | G06V 10/56 |
| | | | | 348/77 |
| 2015/0324400 | A1 * | 11/2015 | Sheck | G06F 16/2228 |
| | | | | 707/795 |
| 2016/0274553 | A1 * | 9/2016 | Strohmenger | G05B 17/02 |
| 2019/0340347 | A1 * | 11/2019 | Long | H04W 12/47 |
| 2021/0065122 | A1 * | 3/2021 | Brockman | G06Q 30/04 |
| 2021/0105375 | A1 * | 4/2021 | Hayashi | H04N 1/4413 |
| 2021/0144140 | A1 * | 5/2021 | Murphy | H04L 9/321 |
| 2021/0203512 | A1 * | 7/2021 | Schiffman | G06F 21/62 |
| 2021/0385659 | A1 * | 12/2021 | Gibbs | H04W 12/65 |
| 2023/0093566 | A1 * | 3/2023 | Chatterton | G06Q 20/3224 |
| | | | | 705/5 |
| 2023/0379683 | A1 * | 11/2023 | Roberts | H04W 4/70 |

OTHER PUBLICATIONS

IBM, "Accelerate Your Journey to AI with a prescriptive approach", https://www.ibm.com/analytics, accessed Mar. 1, 2022, pp. 1-8.

IBM, "Enterprise Cybersecurity Solutions", https://www.ibm.com/security, accessed Mar. 1, 2022, pp. 1-8.

IBM, "What is Industry 4.0?", https://www.ibm.com/topics/industry-4-0, accessed Mar. 1, 2022, pp. 1-12.

Kado et al., "RedTacton Near-body Electric-Field Communications Technology and Its Applications", https://www.ntt-review.jp/archive/ntttechnical.php?contents=ntr201003sf . . . , accessed on Mar. 1, 2022, pp. 1-5.

Mell et al., "The NIST Definition of Cloud Computing", National Institute of Standards and Technology, Special Publication 800-145, Sep. 2011, pp. 1-7.

Podgorski et al. "Towards a conceptual framework of OSH risk management in smart working environments based on smart PPE, ambient intelligence and the Internet of Things technologies." International Journal of Occupational Safety and Ergonomics 23.1 (2017), pp. 1-21.

Raza et al. "Monitoring of soldier's health and transmission of secret codes." 2016 Sixth International Conference on Innovative Computing Technology (Intech). IEEE, 2016, pp. 1-6.

U.S. Department of Homeland Security, "In-Vehicle Inventory Sytems Using RFID Technology Application Note", System Assessment and Validation for Emergency Responders (SAVER), Prepared by Space and Naval Warfare Systems Center Atlantic, Nov. 2013, pp. 1-12.

Kue et al., "A role-based access control system for intelligent buildings." International Conference on Network and System Security. Springer, Cham, 2017, pp. 710-720.

* cited by examiner

DEVICE AND ROLE BASED USER AUTHENTICATION

BACKGROUND

This disclosure relates generally to user authentication, and in particular to device and role-based user authentication utilizing near-body electric-field communications.

Near-body electric-field communications utilize a user as means of amplifying a signal between a transmitter associated with the user and a receiver for capturing the signal. The transmitter emits an alternating current (AC), where a weak AC electric field is established around the user. The transmitter is a small device that can be positioned anywhere on the user, such as, a jacket or shirt pocket. As the user approaches a receiver, the weak AC electric field is captured, and data is transferred between the transmitter and the receiver. Near-body electric-field communications eliminate a user requirement for handling a conventional contactless card for transferring the same data between the conventional contactless card with the transmitter and the receiver.

SUMMARY

Embodiments in accordance with the present invention disclose a method, computer program product and computer system for device and role-based authentication, the method, computer program product and computer system can generate a near-body electrical-field via a communication transmitter associated with a user, wherein a plurality of IoT devices is further associated with the user attempting authentication for access to a location. The method, computer program product and computer system can receive the near-body electrical-field via a communication receiver on an authentication device for identifying the user attempting the authentication. The method, computer program product and computer system can, responsive to identifying the user based on the near-body electrical-field, analyze a plurality of activities associated with a role for the user, wherein the activities require the plurality of IoT devices. The method, computer program product and computer system can analyze plurality of resources associated with the user, wherein the plurality resources include at least the plurality of IoT devices associated with the user. The method, computer program product and computer system can, responsive to determining the user is authenticated based on the analyzing of the plurality of activities and the analyzing of the resources associated with the user, grant access to the location.

DETAILED DESCRIPTION

Figure 1:
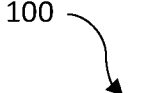
FIG. 1 is a functional block diagram illustrating a distributed data processing environment, in accordance with an embodiment of the present invention.
Figure 1:
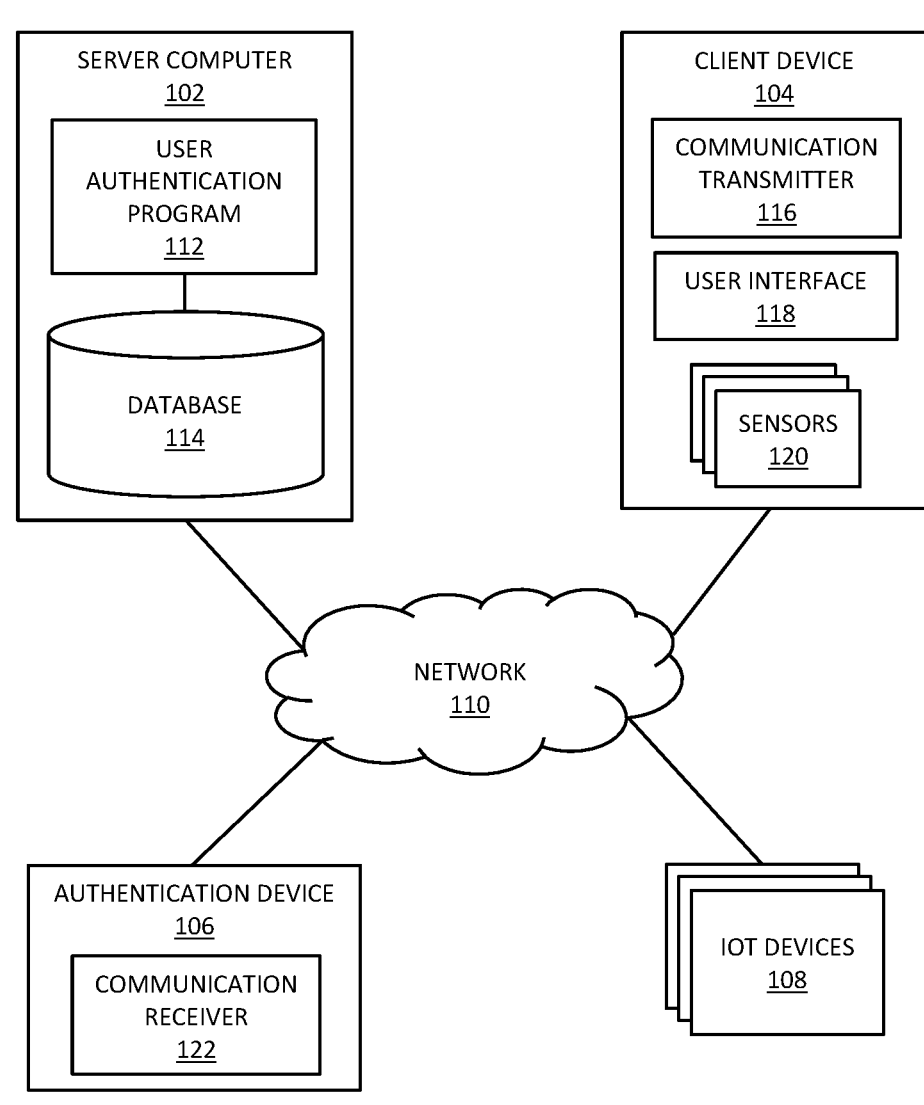

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, authentication device 106, and Internet of Things (IoT) devices 108 all interconnected over network 110. Server computer 102 can be a standalone computing device, a management server, a web server, a mobile computing device, or any programmable electronic device capable of communicating (i.e., sending and receiving data) with client device 104, authentication device 106, IoT devices 108, and other computing devices (not shown) within the distributed data processing environment via network 110. In other embodiments, server computer 102 can represent a server computing system utilizing multiple computers as a server system, such as in a cloud computing environment. In another embodiment, server computer 102 represents a computing system utilizing clustered computers and components (e.g., database server computers, application server computers, etc.) that act as a single pool of seamless resources when accessed within the distributed data processing environment. Server computer 102 includes user authentication program 112 and database 114. Server computer 102 may include internal and external hardware components, as depicted and described in further detail with respect to FIG. 4.

Client device 104 can be a laptop computer, a tablet computer, a smart phone, smartwatch, a smart speaker, or any programmable electronic device capable of communicating (i.e., sending and receiving data) with server computer 102, authentication device 106, IoT devices 108 and other computing devices (not shown) within the distributed data processing environment via network 110. Client device 104 can be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 110. In one embodiment, client device 104 represents one or more devices associated with a user. Client device 104 includes user interface 118 for interacting with user authentication program 112, and sensors 120 for capturing biometric data associated with the user of client device 104.

Sensors 120 collect various data for the user of client device 104, where user authentication program 112 utilizes the data collected by sensors 120 to authenticate a user utilizing near-body electric-field communications. Sensors 120 can include an accelerometer, a gyroscope sensor, an orientation sensor, a pedometer, a heart rate sensor, and a blood pressure sensor.

Authentication device 106 can be a laptop computer, a tablet computer, a smart phone, smartwatch, a smart speaker, or any programmable electronic device capable of communicating (i.e., sending and receiving data) with server computer 102, client device, IoT devices 108 and other computing devices (not shown) within the distributed data processing environment via network 110. Authentication device 106 includes communication receive 122 for receiving a near-body electric-body communication from communication transmitter 116 of client device 104 associated with a user being authenticated.

IoT devices 108 represent one or more electronic devices connected to network 110 capable of communicating (i.e., sending and receiving data) with server computer 102, client device 104, authentication device 106, and other computing devices (not shown) within the distributed data processing environment via network 110. IoT devices 108 can include an instance of an intelligent virtual assistant (IVA) representing a software agent capable of performing various tasks for a user based on commands or questions provided by the user. IoT devices 108 can include but not limited to health monitoring devices, manufacturing equipment, warehouse equipment, wireless inventory trackers, and any other electronic device embedded with sensors and software for connecting and exchanging data with other devices and systems over the Internet (e.g., network 110).

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, client device 104, authentication device 106, IoT devices 108, and other computing devices (not shown) within the distributed data processing environment.

User authentication program 112 identifies IoT devices 108 associated with a user (i.e., user of client device 104) and identifies communication transmitter 116 associated with a user for near-body electrical-field communications. User authentication program 112 generates a near-body electrical-field via communication transmitter 116 associated with the user. User authentication program 112 receives near-body electrical-field communications via communication receiver 122 on authentication device 106 for the user and determines whether the user of client device 104 is identifiable. In the event user authentication program 112 determines the user of client device 104 is not identifiable user authentication program 112 receives sensory data for initial user identification from sensors 120 and various camera feeds in the area. User authentication program 112 analyzes historical user, activity, and location data, and determines a possible identification for the user of client device 104. Subsequently, user authentication program 112 analyzes activities associated with a role for the user of client device 104.

In the event user authentication program 112 determines the user of client device 104 is identifiable user authentication program 112 analyzes activities associated with a role for the user of client device 104. User authentication program 112 analyzes resources associated with the user. User authentication program 112 determines whether the user of client device 104 is authenticated. In the event user authentication program 112 determines the user of client device 104 is authenticated, user authentication program 112 grants access to the user of client device 104 with IoT device 108. In the event user authentication program 112 determines the user of client device 104 is not authenticated, user authentication program 112 denies access to the user of client device 104 with IoT device 108 until appropriate action is taken.

Database 114 is a repository that stores various data including operational data from sensors 120 from client device 104, user profile information (i.e., user of client device 104 and IoT devices 108), and operational data for each of IoT devices 108, and any other data pertinent to user authentication program 112. In another embodiment, database 114 may reside on client device 104 or elsewhere within the distributed data processing environment provided user authentication program 112 has access to database 114. A database is an organized collection of data, where database 114 can be implemented with any type of storage device capable of storing data that can be accessed and utilized by user authentication program 112, such as a database server, a hard disk drive, or a flash memory.

User interface 118 enables a user to make requests of or issue commands to server computer 102, client device 104, authentication device 106, and IoT device 108 via network 110. User interface 118 also enables the user to receive information and instructions in response on client device 104 via network 110. In one embodiment, a user of client device 104 accesses user interface 118 via voice commands in natural language. In one embodiment, user interface 118 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 118 enables a user of client device 104 to interact with an instance of user authentication program 112 operating on server computer 102.

Figure 2:
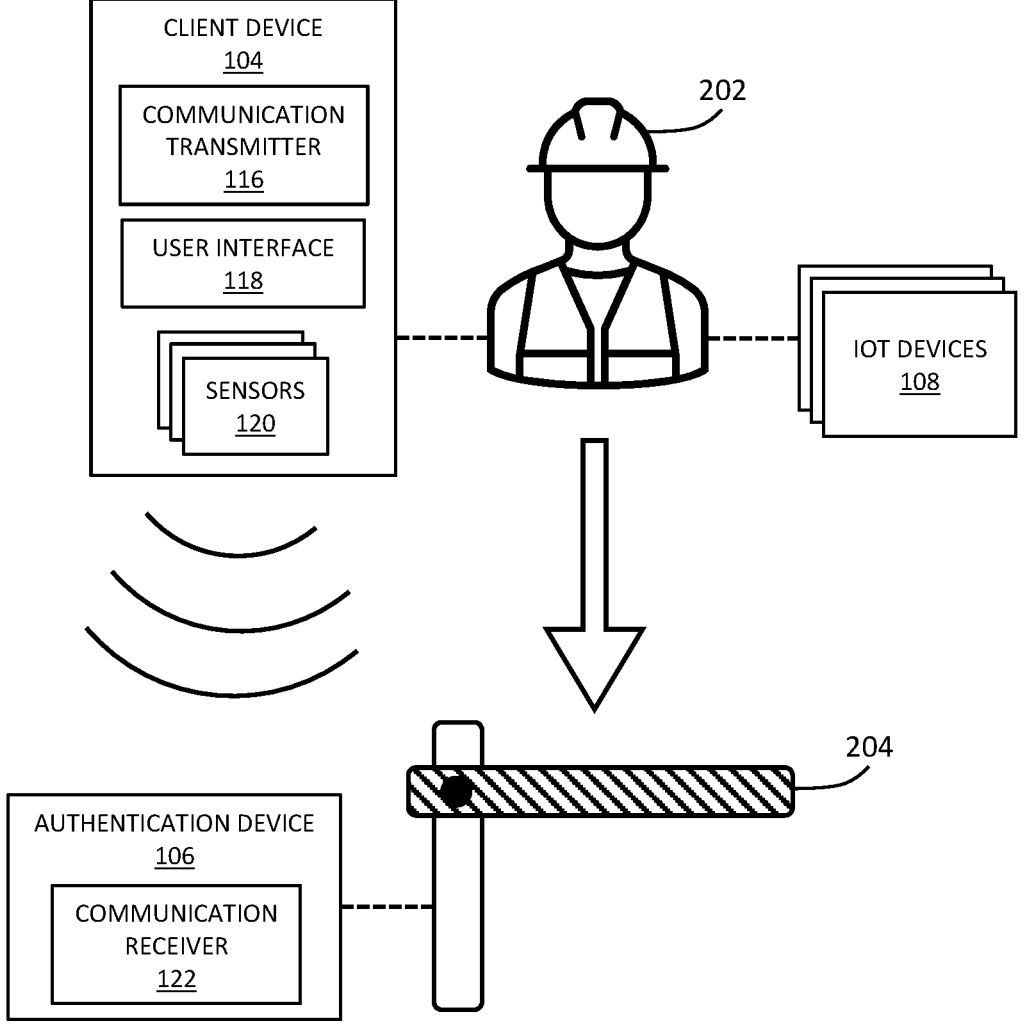
FIG. 2 depicts an example of device interactions in a distributed data processing environment with a user authentication program, in accordance with an embodiment of the present invention.

FIG. 2 depicts an example of device interactions in a distributed data processing environment with a user authentication program, in accordance with an embodiment of the present invention. In one embodiment, employee 202 is attempting to enter a hermetically maintained manufacturing facility that requires various safety equipment and devices to perform assigned tasks based on a role (e.g., job title) of employee 202. To ensure employee 202 is properly protected and equipped prior to entering the hermetically maintained manufacturing facility, user authentication program 112 authenticates employee 202 by identifying IoT devices 108 associated with employee 202 as employee 202 approaches entry gate 204, where IoT devices 108 include embedded microcircuitry for communicating with client device 104 that includes communication transmitter 116, user interface 118, and sensors 120. IoT device 108 can include gloves, hard hat, reflective vest, anti-shock boots, and any other safety equipment with embedded microcircuitry for protecting employee 202 while performing tasks in the hermetically maintained manufacturing facility. IoT devices 108 can also include various tools (e.g., testing equipment) for performing the task, where the various tools also include embedded microcircuitry for communicating with client device 104. User authentication program 112 identifies communication transmitter 116 on client device 104 associated with employee 202 and generates a near-body electrical-field via communication transmitter 116. User authentication program 112 receives the near-body electrical-field via communication receive 122 on authentication device 106 positioned at entry gate 204 and determines whether employee 202 is identifiable based on a unique signature (e.g., metadata with employee 202 identification number) associated with the near-body electrical-field generated by communication transmitter 116. In response to identifying employee 202, user authentication program 112 analyzes tasks to be performed based on the role of employee 202 and analyzes resources (e.g., IoT device 108) associated with employee 202, to ensure employee 202 is properly protected and equipped prior to entering the hermetically maintained manufacturing facility. In response to user authentication program 112 authenticating the user based on the analyzing of the tasks to be performed by employee 202 and the resources associated with employee 202, user authentication program 112 grants access to employee 202 by deactivating security measures at entry gate 204 and allowing employee 202 to enter the hermetically maintained manufacturing facility.

Figure 3:
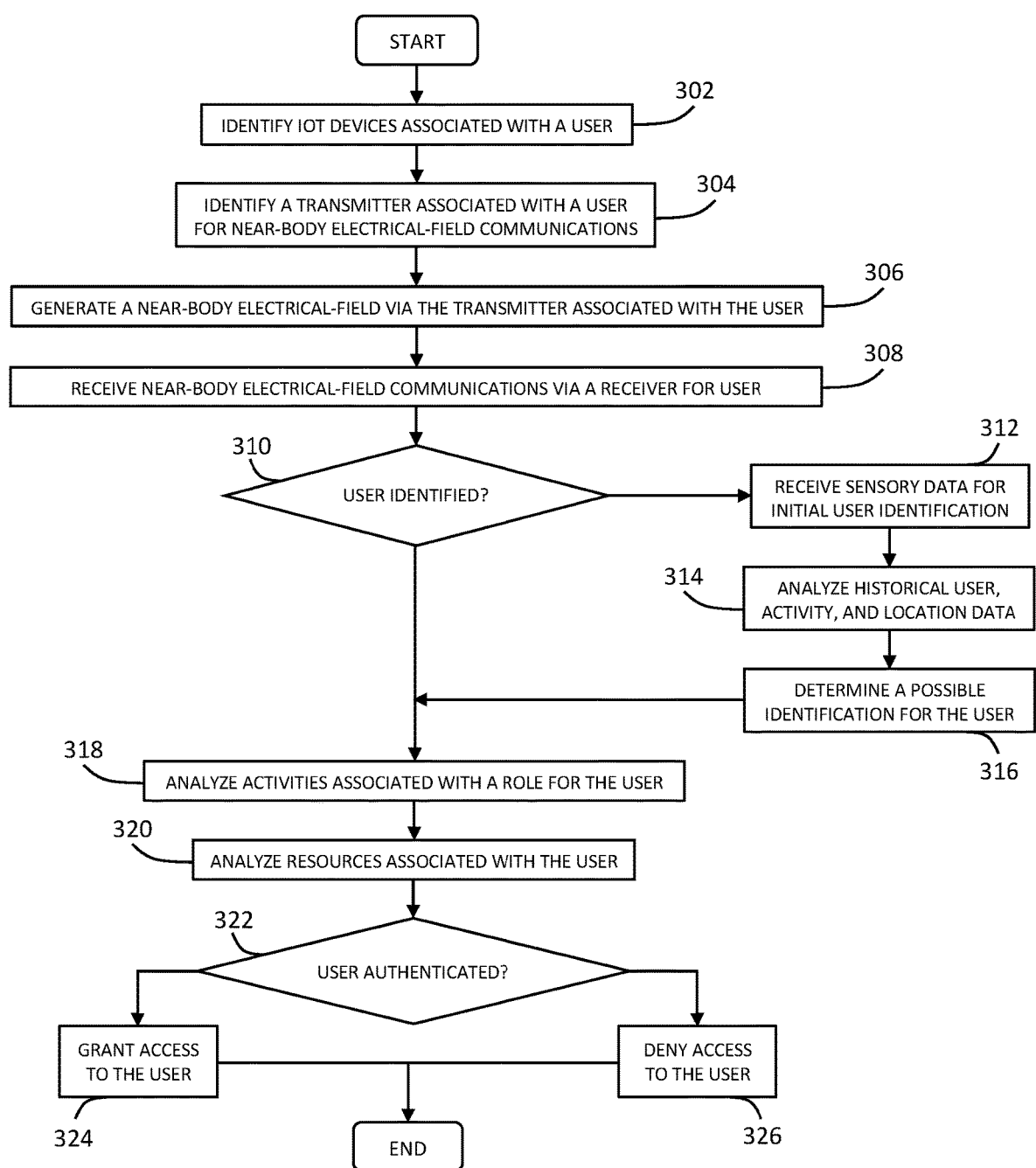
FIG. 3 depicts a flowchart for a user authentication program authenticating a user based on associated devices and a role for the user, in accordance with an embodiment of the present invention.

FIG. 3 depicts a flowchart for a user authentication program authenticating a user based on associated devices and a role for the user, in accordance with an embodiment of the present invention.

User authentication program 112 identifies IoT device associated with a user (302). In one embodiment, a user is an employee attempting to enter a manufacturing facility requiring various resources that include safety equipment and tools for performing activities based on a role assigned to the employee. To ensure the employee is properly protected and equipped prior to entering the manufacturing facility, user authentication program 112 identifies the IoT devices associated with the user via a communication transmitter embedded on a client device associated with the employee. The communication transmitter allows user authentication program 112 to remotely identify the IoT devices associated with the user and subsequently verify that the user is properly equipped to enter the manufacturing facility. In one example, user authentication program 112 operates locally on the client device and can send a local ping via a communication transmitter to identify the IoT devices within a vicinity (e.g., on-body, 1-foot radius) of the user. In another example, user authentication program 112 identifies the IoT devices associated with the user based on a shared short-range connection, where each IoT device connects directly to the client device associated with the user with utilizing a larger network. As previously discussed, the IoT devices can include safety equipment, testing equipment, and/or tools with embedded microcircuitry for communicating with the communication transmitter on the client device associated with the user.

User authentication program 112 identifies a transmitter associated with a user for near-body electrical-field communications (304). The transmitter, also referred to as a communication transmitter, represents embedded circuitry capable of generating a near-body electrical-field for the user. In the embodiment discussed above, the communication transmitter is located on a client device associated with the user attempting to enter the manufacturing facility requiring various resources. As the user approaches an authentication device and the user is positioned within a given range (e.g., 2 feet) of the authentication device, user authentication program 112 identifies the communication transmitter for generating the near-body electrical-field that includes information regarding the identified IoT device and identification information for the user.

User authentication program 112 generates a near-body electrical-field via the transmitter associated with the user (306). In one embodiment, user authentication program 112 generates a near-body electrical-field by utilizing the communication transmitter to emit an alternating current (AC) electrical field signal modulated by input data, that includes the information regarding the identified IoT devices and identification information for the user, from an electrode. A communication receiver with another electrode on the authentication device is configured to receive and read the AC electrical field on the user induced by the signal and demodulates the AC electric field to recover the inputted data. In another embodiment, user authentication program 112 generates a near-body electrical-field via the communication transmitter that is not emitted into space surrounding the user, by suppressing the emission of the electric field from the user into space such that mutual interference is reduced and enables a connection through touch communication since the signal propagates through a bodily surface and not the space surrounding the user.

User authentication program 112 receives near-body electrical-field communications via a receiver for the user (308). As previously mentioned, user authentication program 112 generates a near-body electrical-field by utilizing the communication transmitter to emit an alternating current (AC) electrical field signal modulated by input data and user authentication program 112 receives the near-body electrical-field communications via communication receiver positioned on the authentication device. The communication receiver with another electrode on the authentication device is configured to receive and read the AC electric field on the user induced by the signal and demodulates the AC electric field to recover the inputted data. The communication transmitter and the communication receive are capacitively coupled to the body of the user through flat electrodes, which are equivalent to an antenna typically found in other wireless communication systems. User authentication program 112 modulates the near-body electrical-field through the communication transmitter and reads (i.e., demodulates) the near-body electrical-field through the capacitive coupling. Even if the client device associated with user is positioned in a pocket or on a belt of the user, user authentication program 112 can still generate and receive the near-body electrical-field communication. Near-body electrical-field communication eliminates a requirement of a user manually removing a contactless access card from a pocket for placement near a communication receiver on the authentication device for authentication.

User authentication program 112 determines whether the user is identifiable (decision 310). The near-body electrical-field communication with embedded information regarding the identified IoT devices and identification information for the user. User authentication program 112 utilizes the embedded information to determine if the user is identifiable. In the event user authentication program 112 determines the user is not identifiable ("no" branch, decision 310), user authentication program 112 receives sensory data for initial user identification (312). In the event user authentication program 112 determines the user is identifiable ("yes" branch, decision 310), user authentication program 112 analyzes activities associated with a role for the user (318).

User authentication program 112 receives sensory data for initial user identification (312). User authentication program 112 receives sensory data from a client device with the communication transmitter and/or sensory data from devices within a vicinity of the user requiring initial user identification. In one example, the sensory data from the client device can include previous location information for the user, where the previous location information can indicate whether the user has previously accessed the location (e.g., manufacturing facility) the user is attempting to access. In another example, the sensory data includes biometric data that user authentication program 112 can utilize to attempt to perform the initial user identification. In yet another example, the sensory data includes a video feed from a camera positioned near the authentication device, where user authentication program 112 can utilize the video feed and image analysis to identify the user (e.g., firefighter) based on equipment associated with the user.

User authentication program 112 analyzes historical user, activity, and location data (314). User authentication program 112 utilizes the received sensory data to parse and analyze historical user, activity, and location data to perform the initial user identification. User authentication program 112 determines a possible identification for the user (316). In one example, user authentication program 112 determines the possible identification for the user as a firefighter attempting to access a warehouse facility. User authentication program 112 allows for non-employee users, such as emergency personnel, to access a location regardless of whether the user's identification is present in an employee database. Based on the received sensory data of a video feed of the user, user authentication program 112 analyzes the video utilizing image analysis to determine the user attempting to access the warehouse facility is a firefighter. Furthermore, user authentication program 112 can further determine whether one or more emergency services related alarms are active at the warehouse facility at which the identified firefighter is attempting to access. For example, user authentication program 112 can identify whether a fire suppression system, a smoke alarm, a temperature sensor, and/or a hazmat alarm have been activated.

User authentication program 112 analyzes activities associated with a role for the user (318). In one embodiment, user authentication program 112 analyzes activities associated with a role for the user based on job title for the identified user. In another embodiment, user authentication program 112 analyzes activities associated with a role based on the possible identification for the user from (316), where user authentication program 112 previously determined a possible identification for the user as relating to emergency personnel. In one example, a user is attempting to access a hermetically maintained manufacturing facility, where user authentication program 112 identifies the user as an employee with a job title of a semiconductor testing specialist, whose role is to perform quality testing on semiconductor wafers. Based on the role of the user, user authentication program 112 analyzes the activities associated with performing quality testing of semiconductor wafers, such as, physically handling each semiconductor wafer between two different stages of a manufacturing process. In another example, a user is attempting to access a warehouse facility, where user authentication program 112 determines a possible identification for the user as relating to emergency services (e.g., firefighter), whose role is to contain any fire related incidents. Based on the role of the user, user authentication program 112 analyzes the activities associated with containing any fire related incidents, such as, entering areas with lower oxygen levels due to smoke conditions. In other embodiments, user authentication program 112 utilizes a segregation of duties (SoD) matrix to analyze each user relative to a role and a level of access assigned to each user.

User authentication program 112 analyzes resources associated with the user (320). In this embodiment, user authentication program 112 analyzes the resources associated with the user with respect to the activities associated with the role for the user. Furthermore, user authentication program 112 can also analyze the resources associated with the user with respect to an incident occurring at a location for which the user is attempting to access. As previously discussed, the resources represent equipment and tools that user authentication program 112 previously identified in 302. User authentication program 112 analyzes the resources to determine if the user has the proper equipment and tools to accurately and safety perform tasks based on the role assigned to the user. In one example, a user is attempting to access a hermetically maintained manufacturing facility, where user authentication program 112 identifies the user as an employee with a job title of a semiconductor testing specialist, whose role is to perform quality testing on semiconductor wafers. User authentication program 112 analyzes the activities associated with performing quality testing of semiconductor wafers and analyzes the equipment currently with the user to determine if the user is properly equipped to perform the quality testing of semiconductor wafers. In this example, the resources can include one or more quality control test equipment, anti-static gloves, anti-static boots, anti-static body suit, eye-protection, and a face mask. User authentication program 112 analyzes the resources to determine whether all the required resources are present and meet specified requirements for performing the activities associated with the role for the user. In another example, a user is attempting to access a warehouse facility, where user authentication program 112 determines a possible identification for the user as relating to emergency services (e.g., firefighter), whose role is to contain any fire related incidents. User authentication program 112 analyzes the activities associated with containing any fire related incidents and analyzes the equipment currently with the user to determine if the user properly equipped to perform the containing of any fire related incidents. In this example, the resources can include an alert beacon, a torch light, a helmet, an oxygen apparatus, a fire-resistant suit, fire and slip resistant boots, and a communication device (e.g., radio). User authentication program 112 analyzes the resources to determine whether all the required resources are present and meet specified requirements for performing the activities associated with the role for the user. User authentication program 112 can also analyze one or more emergency services related alarms active at the warehouse facility to determine if the user properly equipped to handle the situation. For example, if a hazmat alarm is active and the user is equipped to handle fire related incidents, user authentication program 112 analyzes the resources of the user with respect to the hazmat alarm and fails to authenticate the user due to the differentiation of the two types of incidents and the user not being properly trained and/or equipped to handles the identified incident.

User authentication program 112 determines whether the user is authenticated (decision 322). In this embodiment, user authentication program 112 determines whether user is authenticated based on the analysis of the activities associated with the role of the user and the analysis of the resources associated with the user for performing the role. If the resources associated with the user to accurately and safely perform the activities associated with the role of the user are present, user authentication program 112 grants access to the user. If the resources associated with the user to accurately and safely perform the activities associated with the role of the user are not present, user authentication program 112 denies access to the user. In the event user authentication program 112 determines the user is authenticated ("yes" branch, decision 322), user authentication program 112 grants access to the user (324). Granting access to the user can include unlocking a door and/or opening an entry gate, allowing for the user to pass through to the location. In the event user authentication program 112 determines the user is not authenticated ("no" branch, decision 322), user authentication program 112 denies access to the user (324). Denying access to the user can include maintaining a locked door and/or entry gate, preventing the user from passing through to the location.

Embodiments of the present invention provide a near-body electric-field physical authentication system to validate if the user is carrying required equipment and/or devices while attempting to enter an area to perform an activity. Embodiments of the present invention validate if the equipment and/or devices being carried are within the same electromagnetic field of the user's near-body electric-field, as generated by a communication transmitter. For example, an authentication device on an entry gate can validate if a construction worker has appropriate safety helmet, belt while entering or if a metal cutting employee is carrying proper gloves, eye glass, or any other equipment required for performing a job role. Embodiments of the present invention can validate that the available resource are present with the equipment being carried while entering inside the enclosed area, and accordingly based on available resource the user is having in different devices, appropriate level of access can be provided. For example, the user is carrying a torch light to enter inside a cave, and the battery power is not sufficient, so the level of authentication can be adjusted for the user. Embodiments of the present invention can also validate types of equipment being carried by the user while entering inside any enclosed area, and accordingly based on a device capability, an appropriate level of authentication can be provided to the user. For example, a construction worker should carry goggles, safety belt, helmet, gloves while entering an enclosed area, and the embodiment of the present invention determine the worker is not carrying a helmet, so the restricted level of permission can be provided until the worker obtains the proper equipment (i.e., helmet).

Embodiments of the present invention validate the readiness of the person along with the near-body electric-field system, embodiments of the present invention can validate if the equipment is being carried properly and provide a readiness factor of the user for an appropriate level of authentication. In one example, if a user is carrying helmet, but not wearing the helmet, the embodiments of the present invention can validate the readiness factor. User authentication program 112 can classify the role-based authentication with the types of equipment and readiness factor, and accordingly role-based authentication can be validated. In another example, different role needs different types of equipment, the role can be a warehouse employee or construction worker, and each role needs different types of equipment. The relative position of each equipment can be identified in for different portion of the user and accordingly be validating the readiness factor of the user who is trying to get an entry and based on readiness factor appropriate level of authentication can be provided. In yet another example, IoT enabled devices and/or equipment can identify a relative position of each other and movement patterns to predict how the user is carrying the devices.

Embodiments of the present invention can derive the role and intended activities for the unknown, new, and/or unregistered entering users based on various data sources including visual monitoring, location, and publicly available information. Embodiments of the present invention utilizes data sources like calendar, communications, and social media to derive role and intended activities for the registered users. In a first example, in case of a fire at a building, the firefighters and other emergency responders will most likely not be known by user authentication program 112. Embodiments of the present invention can determine the equipment requirement based on general requirement of equipment at the place of fire derived through a real-time internet search. In a second example, for a construction site there can be a new construction worker. Embodiments of the present invention can determine the helmet requirement based on location being a construction site. In a third example, at a construction site there can be a new construction worker. Embodiments of the present invention can determine the helmet requirement based on predicting the user to be a construction worker because last three entered users were known construction workers. In a fourth example, for maintenance of an electrical device, embodiments of the present invention can determine the shock resisting equipment requirement based on the calendar of the entering user, where the calendar entry indicates that the user is to perform maintenance on the electric device.

The equipment is IoT enabled and can be recognized uniquely based on an identified IoT feed type for the device. The IoT enabled devices can include various sensors to identify the movement and any other sensor feed which is used for recognizing the device. Based on the signal received from near-body electric-field based physical authentication system, embodiments of the present invention can recognize the user. Based on the recognition of the user, embodiments of the present invention can recognize the role of the user, in this case role of the user can be identified based on types of activity the user performs. Each role can require different types of devices or equipment, and the system can validate the said devices. Embodiments of the present invention can identify the duration of activities, and accordingly be estimating how much resource the user should be having while performing the activities. Embodiments of the present invention can associate different devices and/or equipment with the activity or role. The resource available with the device can also be considered as one or the criteria to provide access to the user and level of permission to enter.

When any user wants to enter through any user gate, the user should be carrying the device which is enabling signal for near-body electric-field signal. While the user is moving through the user gate the near-body electric-field based user authentication program 112 can recognize the user based on the signal received from the user. Based on recognition of the user, embodiments of the present invention can also identify the activities of the user or the role of the user. User authentication program 112 can identify what devices and/or equipment the user should be carrying. If any user wants to enter through any user gate having near-body electric-field based physical authentication system, then the user should be pairing the devices which are required during a period of access to the location. The proposed near-body electric-field based User authentication program 112 can recognize the user and identify which devices or equipment the user is carrying. Embodiments of the present invention can identify the resource available with the devices the user is carrying. Embodiments of the present invention can identify the level of preparedness, like how many required devices the user is carrying and the resource level. User authentication program 112 can grant and appropriate authentication to perform activities in the surrounding. Embodiments of the present invention can track the relative position of the equipment and/or devices to identify which devices are being carried and where the devices and/or equipment is utilized. Based on the location of the devices, user authentication program 112 can identify the readiness of the user to enter the surrounding. User authentication program 112 can derive the role and intended activities. For the unknown, new, and unregistered user entering the location, user authentication program 112 can derive the identity for the user based on various data sources like visual monitoring, existing users entered recently, location and publicly available information. Embodiments of the present invention first derives what type of user and based on the type, embodiments of the present invention derive the activities. For the known, existing, and/or registered users, embodiments of the present invention derive based on calendar entries and communications (like email and SMS). Embodiments of the present invention can log the results authentication attempts and notify appropriate stakeholders for multiple failed logon attempts.

Embodiments of the present invention can utilize an Optional Validation of Role and/or Task based Separation of Duties (SoD) Matrix. For different user roles with different access levels for physical locations, some of the various users can have access to certain types of access area and some business users will have limited access to physical locations. For the SOD Matrix where every user's role and responsibility are stored in the organization, user authentication program 112 can identify which users are having access to which areas based upon the SoD Matrix.

Figure 4:
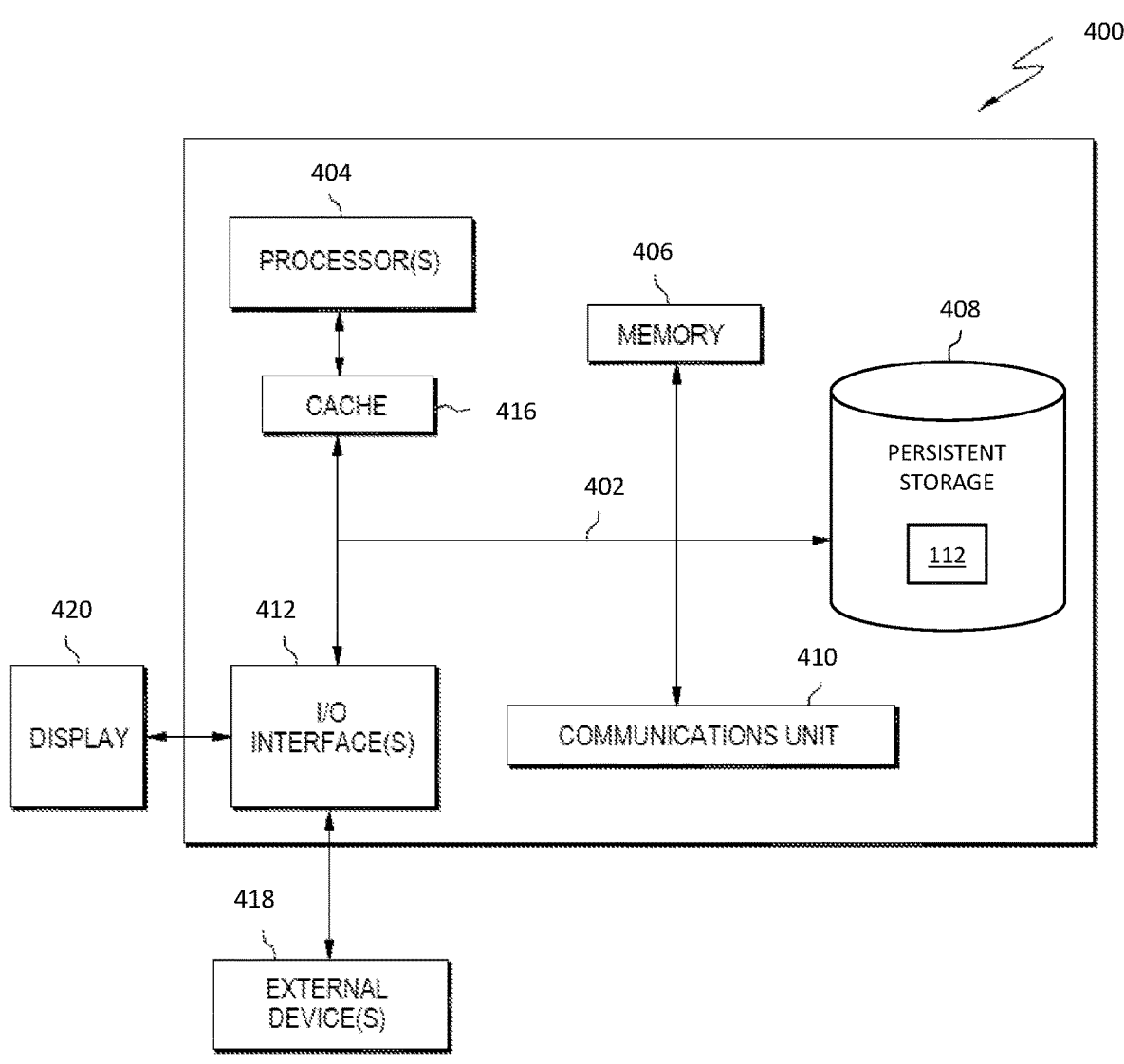
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes user authentication program 112. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
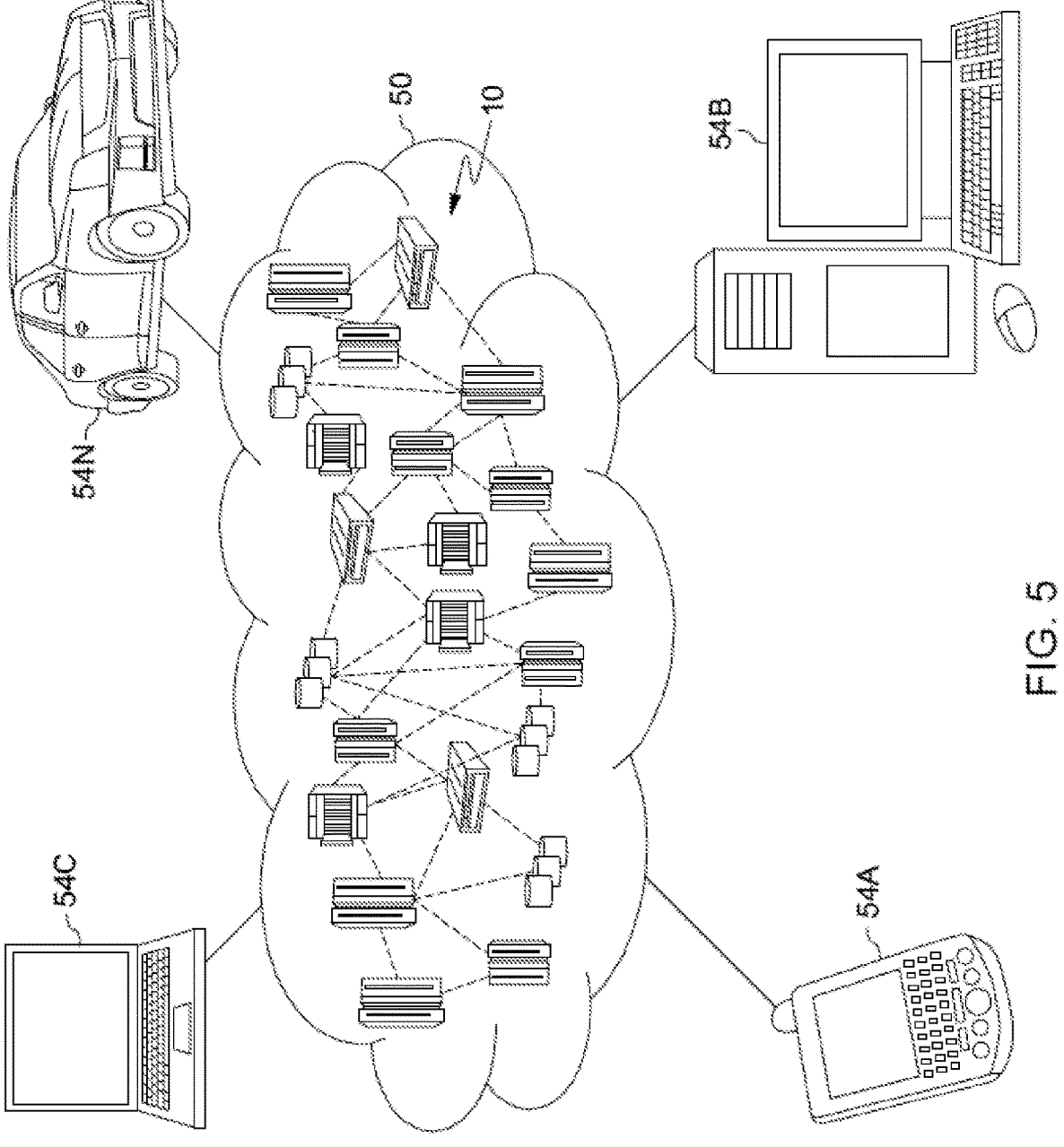
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
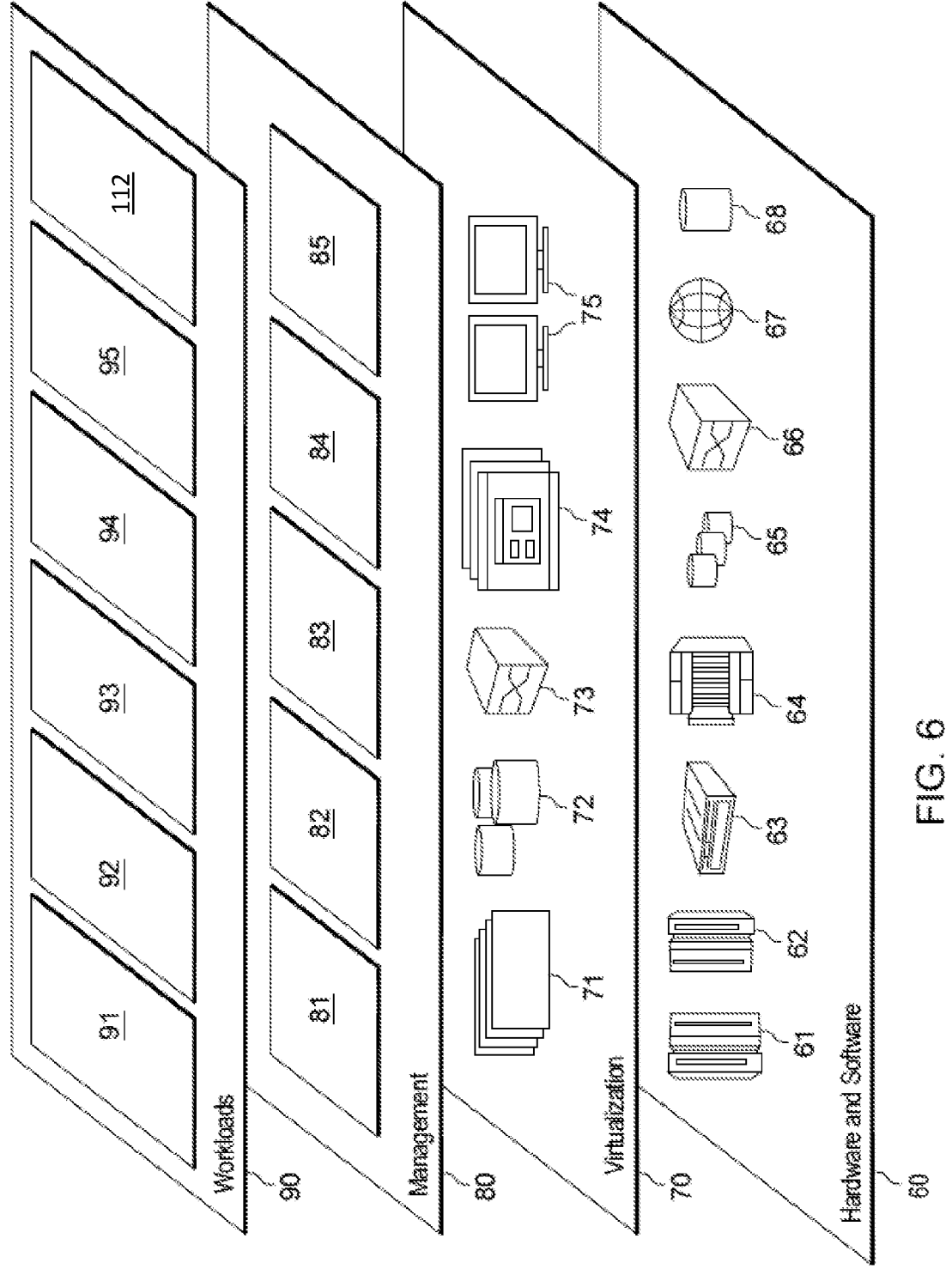
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user authentication program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

generating a near-body electrical-field via a communication transmitter associated with a user, wherein a plurality of IoT devices is further associated with the user attempting authentication for access to a location;

receiving the near-body electrical-field via a communication receiver on an authentication device for identifying the user attempting the authentication;

in response to identifying the user based on the near-body electrical-field, analyzing a plurality of activities associated with a role for the user, wherein the plurality of activities require the plurality of IoT devices;

analyzing plurality of resources associated with the user, wherein the plurality of resources include at least the plurality of IoT devices associated with the user;

determining whether the user is authenticated based on the analyzing of the plurality of activities and the analyzing of the plurality of resources associated with the user, to perform the plurality of activities at the location; and in response to determining the user is authenticated based on the analyzing of the plurality of activities and the analyzing of the plurality of resources associated with the user, granting the access to the location.

2. The method of claim 1, wherein the plurality of resources further include one or more resources capturable by a camera feed of the user attempting the authentication for the access to the location.

3. The method of claim 1, further comprising:

identifying the plurality of IoT devices based on a shared short-range connection with a client device associated the user.

4. The method of claim 3, wherein the client device associated with the user includes the communication transmitter.

5. The method of claim 1, further comprising:

determining whether one or more emergency services related alarms are active at the location; and responsive to determining at least one of the one or more emergency services related alarms are active, analyzing resources associated with the user based on at least one of the one or more emergency services related alarms.

6. The method of claim 1, wherein analyzing the plurality of resources associated with the user determines if the plurality of resources allow for the user to perform the plurality of activities.

7. A computer program product comprising:

one or more non-transitory computer readable storage media; and program instructions stored on the one or more non-transitory computer readable storage media to perform operations comprising:

generating a near-body electrical-field via a communication transmitter associated with a user, wherein a plurality of IoT devices is further associated with the user attempting authentication for access to a location;

receiving the near-body electrical-field via a communication receiver on an authentication device for identifying the user attempting the authentication;

in response to identifying the user based on the near-body electrical-field, analyzing a plurality of activities associated with a role for the user, wherein the plurality of activities require the plurality of IoT devices;

analyzing plurality of resources associated with the user, wherein the plurality of resources include at least the plurality of IoT devices associated with the user;

determining whether the user is authenticated based on the analyzing of the plurality of activities and the analyzing of the plurality of resources associated with the user, to perform the plurality of activities at the location; and in response to determining the user is authenticated based on the analyzing of the plurality of activities and the analyzing of the plurality of resources associated with the user, granting the access to the location.

8. The computer program product of claim 7, wherein the plurality of resources further include one or more resources capturable by a camera feed of the user attempting the authentication for the access to the location.

9. The computer program product of claim 7, wherein the operations further comprise:

identifying the plurality of IoT devices based on a shared short-range connection with a client device associated the user.

10. The computer program product of claim 9, wherein the client device associated with the user includes the communication transmitter.

11. The computer program product of claim 7, wherein the operations further comprise:

determining whether one or more emergency services related alarms are active at the location; and in response to determining at least one of the one or more emergency services related alarms are active, analyzing resources associated with the user based on at least one of the one or more emergency services related alarms.

12. The computer program product of claim 7, wherein analyzing the plurality of resources associated with the user determines if the plurality of resources allow for the user to perform the plurality of activities.

13. A computer system comprising:

a processor set;

one or more non-transitory computer readable storage media; and program instructions stored on the one or more non-transitory computer readable storage media to cause the processor set to perform operations comprising:

generating a near-body electrical-field via a communication transmitter associated with a user, wherein a plurality of IoT devices is further associated with the user attempting authentication for access to a location;

receiving the near-body electrical-field via a communication receiver on an authentication device for identifying the user attempting the authentication;

in response to identifying the user based on the near-body electrical-field, analyzing a plurality of activities associated with a role for the user, wherein the plurality of activities require the plurality of IoT devices;

analyzing plurality of resources associated with the user, wherein the plurality of resources include at least the plurality of IoT devices associated with the user;

determining whether the user is authenticated based on the analyzing of the plurality of activities and the analyzing of the plurality of resources associated with the user, to perform the plurality of activities at the location; and in response to determining the user is authenticated based on the analyzing of the plurality of activities and the analyzing of the plurality of resources associated with the user, granting the access to the location.

14. The computer system of claim 13, wherein the plurality of resources further include one or more resources capturable by a camera feed of the user attempting the authentication for the access to the location.

15. The computer system of claim 13, wherein the operations further comprise:

identifying the plurality of IoT devices based on a shared short-range connection with a client device associated the user.

16. The computer system of claim 15, wherein the client device associated with the user includes the communication transmitter.

17. The computer system of claim 13, wherein the operations further comprise:

determining whether one or more emergency services related alarms are active at the location; and in response to determining at least one of the one or more emergency services related alarms are active, analyzing resources associated with the user based on at least one of the one or more emergency services related alarms.

18. The computer system of claim 13, wherein analyzing the plurality of resources associated with the user determines if the plurality of resources allow for the user to perform the plurality of activities.

* * * * *